Aug. 19, 1947.    O. FREGEOLLE    2,426,010
WRAP SPINDLE
Filed Jan. 3, 1945    7 Sheets-Sheet 2

INVENTOR:
OSCAR FREGEOLLE,
ATT'Y.

Aug. 19, 1947. O. FREGEOLLE 2,426,010
WRAP SPINDLE
Filed Jan. 3, 1945 7 Sheets-Sheet 4

INVENTOR:
OSCAR FREGEOLLE,
BY
ATTY.

Aug. 19, 1947.  O. FREGEOLLE  2,426,010
WRAP SPINDLE
Filed Jan. 3, 1945  7 Sheets-Sheet 7

FIG. 16.

INVENTOR:
OSCAR FREGEOLLE,

ATT'Y.

Patented Aug. 19, 1947

2,426,010

UNITED STATES PATENT OFFICE 2,426,010

WRAP SPINDLE

Oscar Fregeolle, Central Falls, R. I., assignor to Hemphill Company, Central Falls, R. I., a corporation of Massachusetts Application January 3, 1945, Serial No. 571,153

11 Claims. (Cl. 66—135)

This invention relates to the circular, independent needle, type of knitting machine and more particularly to mechanism for producing wrap patterns in consecutive courses by reciprocatory knitting. Although such wrap patterns have been theoretically possible they have never been commercially produced because of the lack of appropriate mechanism. By the mechanism of this invention wrap patterns of great perfection can be produced by rotary and reciprocatory knitting in any desired number of consecutive or spaced courses.

To do this, the instep yarn lever and the wrap spindle are positioned directly opposite one another on opposite sides of the needle circle so that both the instep and wrap yarn can be fed in exactly the same relation in each direction of reciprocatory knitting. This will be understood by those skilled in the art and also is disclosed in co-pending application #521,488, now Patent #2,374,532, filed February 8, 1944. In addition, since the needles selected for wrapping should be wrapped the same distance ahead of the knitting point in each direction of knitting and since they knit under different knitting cams in each direction, the wrapping point for the same needle varies to this extent. Consequently, the timing of the wrap spindle must be accommodated to this variation so that the same wrap yarn will be presented to the same needle or needles at the two respective wrapping points. Also if a multi-needle wrap is made the wrap spindle must be additionally retimed to compensate for the width of the wrap since the last needle wrapped in one direction is the first needle wrapped in the other.

This invention is concerned particularly with wrap spindle mechanism capable of such retiming. The wrap spindle and operating mechanism selected for description herein is that for use in a circular, independent needle knitting machine of the Banner type but it will be understood, of course, that the invention is not limited to machines of that type or to the particular mechanisms described and shown in the drawings of which:

Figure 1:
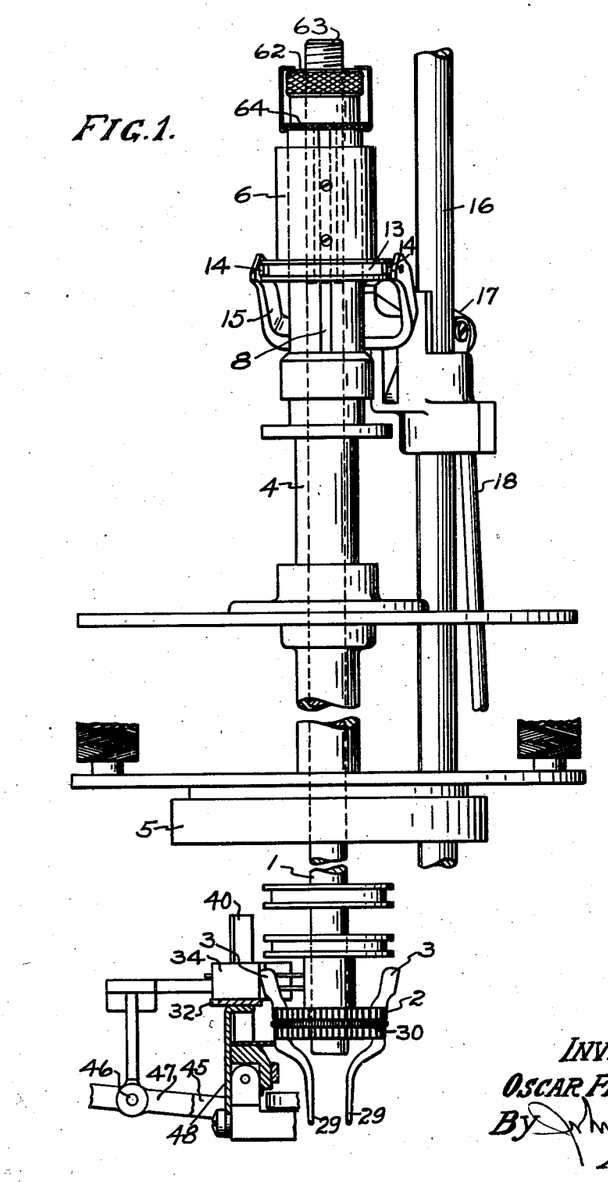
Fig. 1 is an elevation of the wrap spindle of this invention and the means by which the wrap yarn feeding fingers are operated.

As shown in Fig. 1 the wrap spindle consists of a shaft 1 upon the lower end of which is mounted the wrapping head 2, as usual. This wrapping head may be of any suitable type but, preferably, is one provided with a plurality of wrapping fingers 3 so shaped, positioned and operated that each can be independently swung across the needle circle. Surrounding shaft 1 is a sleeve 4 which is rotated by suitable gearing within the housing 5, at the same angular speed as the needle cylinder. Slidable upon sleeve 4 is another sleeve 6. Sleeve 6 is caused to rotate with sleeve 4 by a key 7 (Fig. 5) fitting into a key-way 8 in both sleeves 4 and 6. Shaft 1 is normally driven through sleeve 6 by means of a pin 9 (Figs. 2, 3 and 4) provided with a roller 10 which projects through an opening 11 in sleeve 4 and into slot 12 in sleeve 6.

Figures 2, 3, 4, 5:
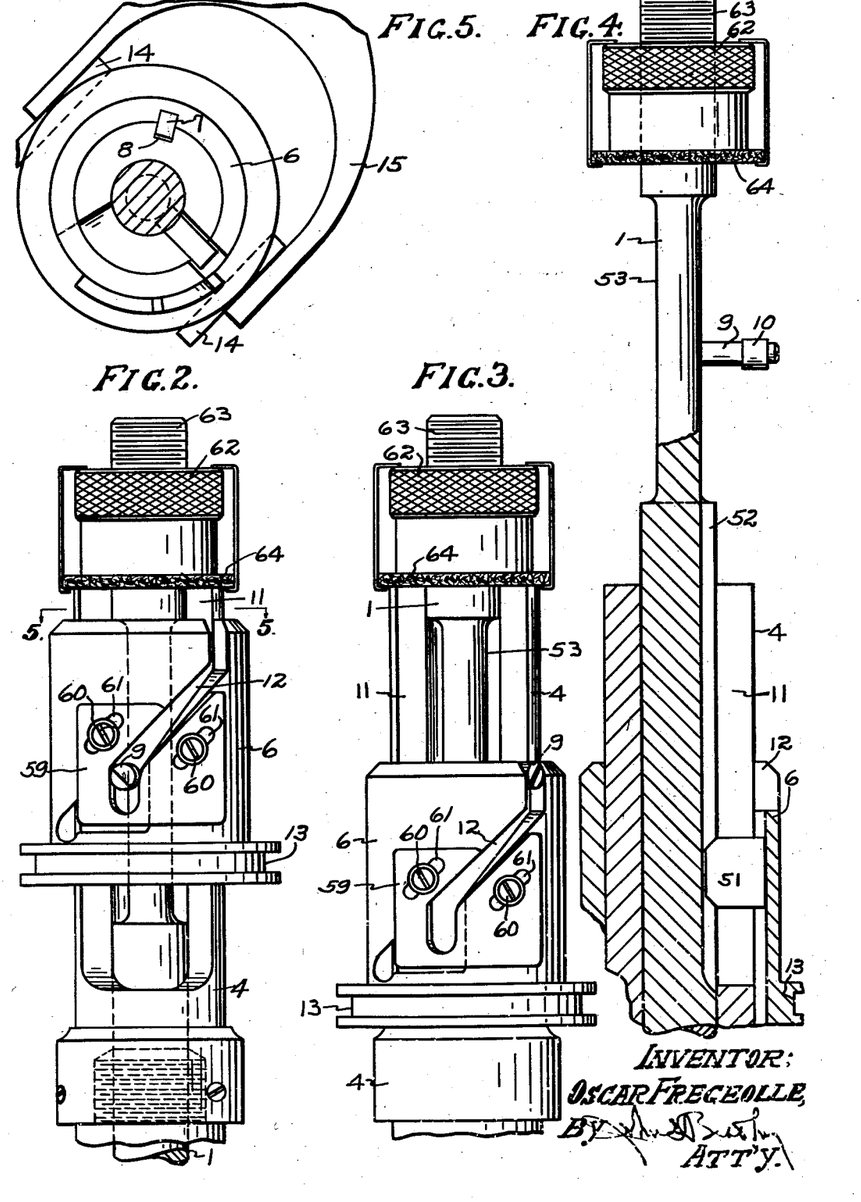
Fig. 2 is an elevation of the upper part of the wrap spindle of Fig. 1 viewed from the opposite side.
Fig. 3 is a view similar to Fig. 2 with some of the parts in a different position.
Fig. 4 is a view of part of the same wrap spindle illustrating another operating condition.
Fig. 5 is a plan view, partly in section, on the line 5—5 of Fig. 2 viewed as indicated by the arrows.
Figure 6:
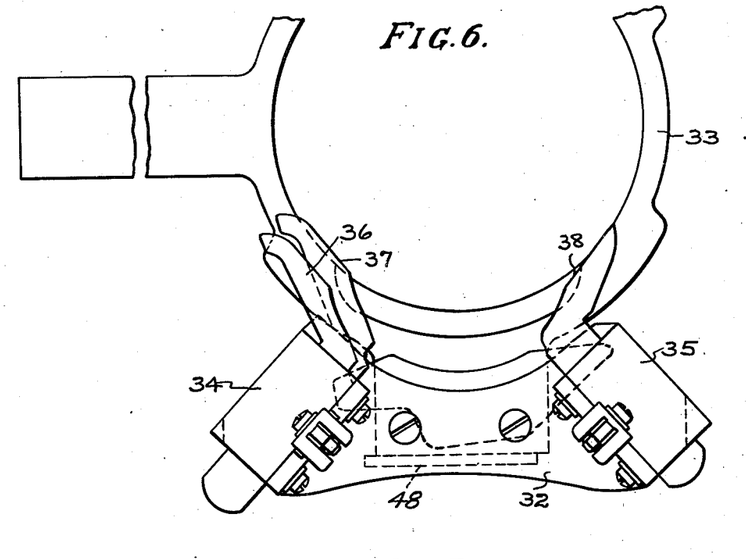
Figs. 6 and 7 are plan and elevational views, respectively, of the mechanism for controlling the wrap yarn feeding fingers.
Figure 7:
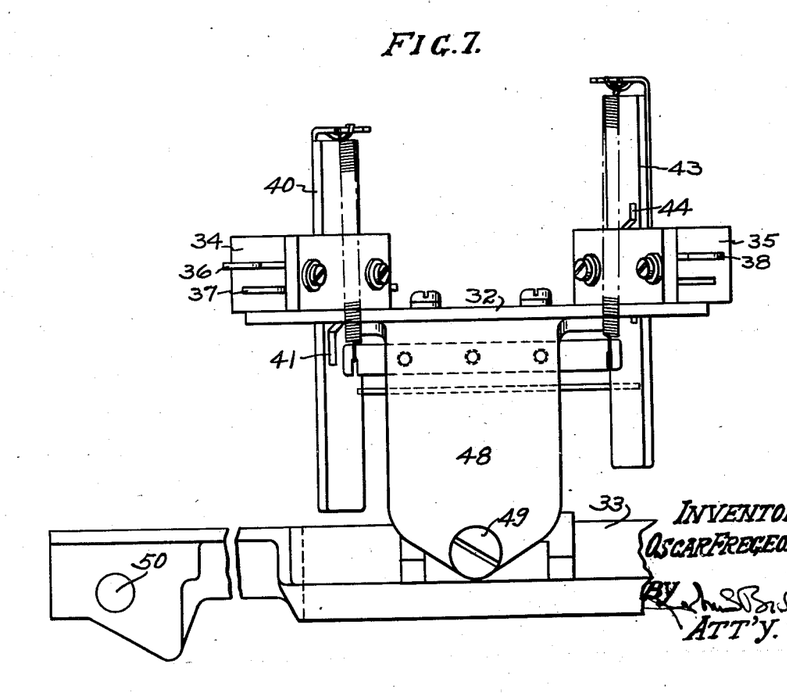

As will be seen in Figs. 2 and 3, slot 12 in sleeve 6 has a portion between its ends running diagonally around the sleeve. Also as previously stated, sleeve 6 is slidable on sleeve 4. By this means, the angular position of shaft 1 with respect to sleeve 4 and, consequently, of the wrapping head with respect to the needle cylinder can be changed. As shown in Fig. 2, if sleeve 6 is raised pin 9 will move relatively down the diagonal part of slot 12 and, in consequence, shaft 1 will be rotated to the left independently of and without interfering with the rotation of the spindle as a whole. Similarly, if sleeve 6 is moved to the low position shown in Fig. 3, shaft 1 will be swung to the right as pin 9 travels relatively up slot 12 with the result that the angular position of shaft 1 and the wrapping head with respect to sleeve 4 is altered also without affecting any common rotation of these parts.

The actual contact between slot 12 and pin 9 is through roller 10 whereby friction is minimized. The degree of shogging required will depend upon the character of the wrap pattern being made. Since the wrap spindle and cylinder are driven in a 1 x 1 relation it follows that, without shogging, the same wrap yarn feeding finger and the same needle would be opposed to one another only at one point around the cylinder. Therefore, during reciprocatory knitting it would be impossible to wrap the same needle by the same finger in both directions. Consequently, it is necessary to reposition the wrapping head so that this finger will be in wrapping position at the corresponding point on the other side of the yarn feed. Also if a multi-needle wrap is being made the wrapping head requires a further repositioning because the first needle wrapped in one direction is the last needle wrapped in the other. Therefore, the degree of repositioning or shogging of the wrapping head through the wrap spindle must be great enough to compensate for the angular difference between the two wrapping points in the two directions of reciprocatory knitting plus the angular space occupied by the maximum number of needles which will be wrapped in a single operation by a single finger.

Figure 15:
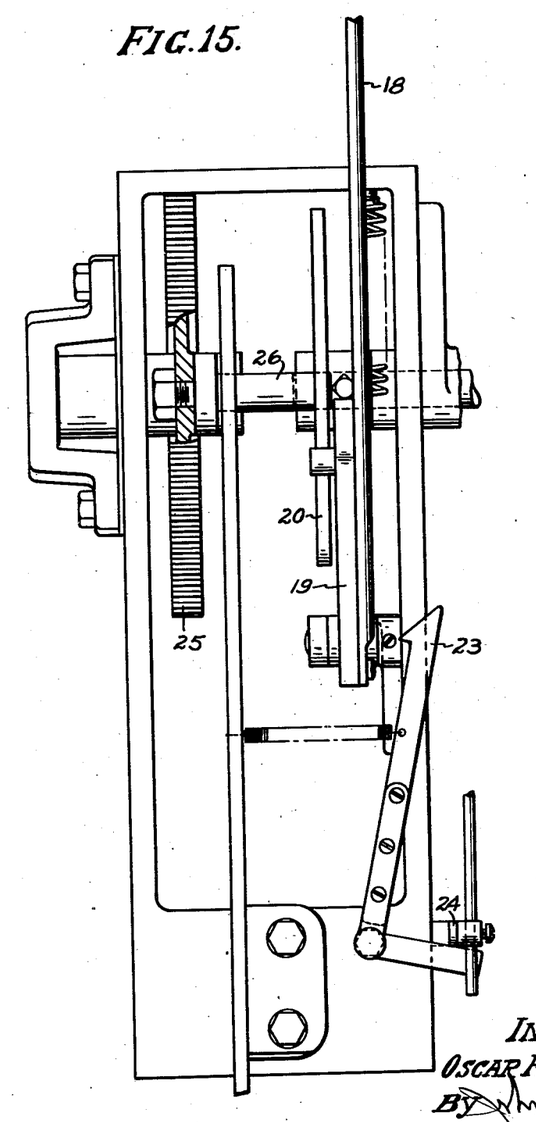
Figs. 15 and 16 are views illustrating the controlling mechanism by means of which the retiming of the wrap spindle is determined.
Figure 16:
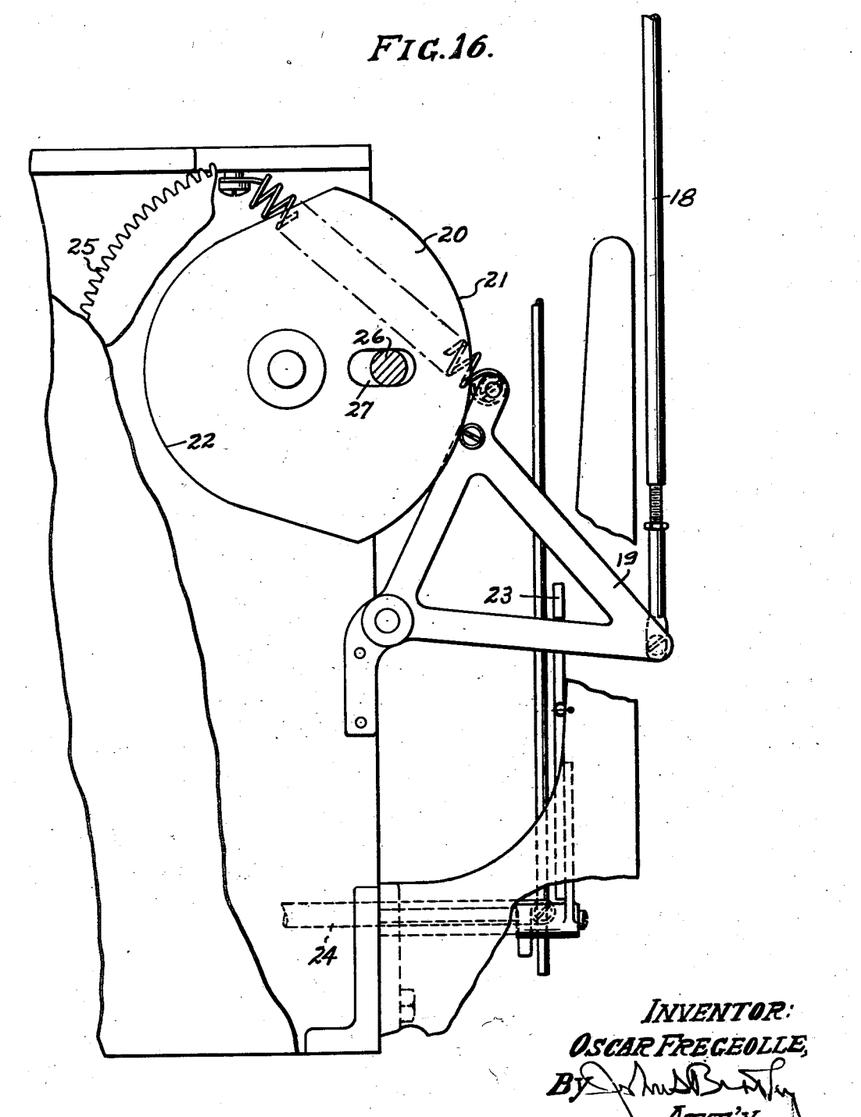

The sliding movement of sleeve 6 upon sleeve 4 above described is effected through the following mechanism. An annular channel 13 is provided on sleeve 6 within which blocks 14 (Fig. 5) are positioned. These blocks are pivoted to a yoke 15 which can be rocked in a vertical plane by suitable timing mechanism. One form of such mechanism is shown in Figs. 1, 15 and 16. As shown in Fig. 1 yoke 15, which is pivoted on a bracket attached to upright 16, has a tail 17 connected to a rod 18, the other end of which connects with a pivotal rocker 19 (Figs. 15 and 16) which is rocked by a cam 20. While rocker 18 is riding upon high surface 21 of cam 20, sleeve 6 is in its high position shown in Figs. 1 and 2. When rocker 19 is on the low part 22 of cam 20 sleeve 6 is in its low position shown in Fig. 3. During reciprocatory knitting rocker 19 will function in this way, alternately raising and lowering sleeve 6 to shog the wrapping head, as already described, to position it correctly for wrapping in each direction of reciprocatory knitting.

For wrapping during rotary knitting the wrapping head should, of course, remain in one position, the same as that for counter-clockwise reciprocatory knitting, for example. This is accomplished by so positioning the wrapping head that it is in the correct position for counter-clockwise knitting when sleeve 6 is in its high position shown in Figs. 1 and 2. It is maintained in this position throughout rotary knitting by locking the rocker 19 in the position shown in Fig. 16, i. e., the position which it assumes when riding upon the high part 21 of cam 20.

Rocker 19 is retained in this position by means of a latch 23 (Figs. 15 and 16) which at the desired times is made to engage the rocker as shown in Fig. 16 to prevent it from following the contour of cam 20. Latch 23 is operated through linkage indicated at 24 in Figs. 15 and 16 under the control of a suitable pattern device such, for example, as that shown in Patent #2,083,027.

Cam 20 is driven directly from the 104 gear 25 by means of a crank pin 26 attached to gear 25 and projecting through a slot 27 in cam 20. Consequently, since the 104 gear 25 always rotates once for every four revolutions of the cylinder or once for every complete cycle of reciprocatory knitting, cam 20 will do likewise.

Although the wrap spindle can be shogged at any suitable time, shogging occurs preferably, approximately when the needle cylinder reverses between reciprocatory strokes.

Figures 8, 9, 10, 11, 12, 13:
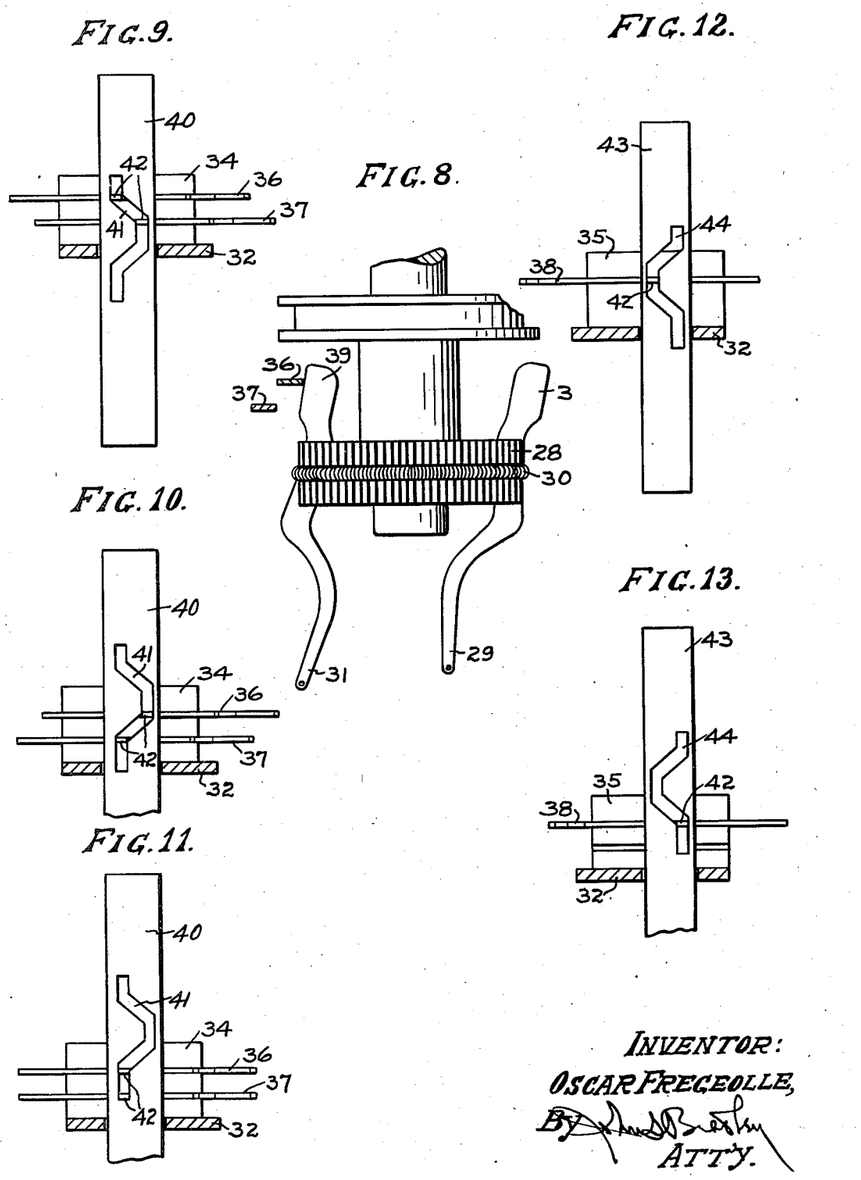
Fig. 8 is a diagrammatic view illustrating the manner in which these fingers are operated.
Figs. 9–13 illustrate five positions of the finger operating mechanisms.

The wrapping head used may be of any suitable type. That shown at 2 diagrammatically in Figs. 1 and 8 is of the type having radially swingable wrap yarn feeding fingers 3 positioned in slots in a disc 28. These are so constructed that normally their feeding ends will be maintained in their inward position as shown at 29 in Figs. 1 and 8 by means of a spring 30, for example. When in this position they are, of course, inside the needle circle and inoperative. To establish a finger 3 in wrap yarn feeding position it is swung out as shown at 31 in Fig. 8 so that it lies outside the needle circle.

The mechanism for operating the wrap yarn feeding fingers in this way is shown in Figs. 1 and 6-13. As shown, this consists of a plate 32 positioned above the carrier ring 33. On plate 32 is mounted holders 34 and 35. Within holder 34 are slidably mounted operating levers 36 and 37. Within holder 35 is mounted an operating lever 38. Each of these levers is so positioned that when projected inwardly it will engage and rock inwardly the upper end 39 of a finger 3 above its fulcrum so that the feeding end will be swung outwardly as shown at 31 in Fig. 8.

The means for operating fingers 36 and 37 consists of a vertically slidable plate 40 provided with a slot 41 having the shape shown in Figs. 9–11. Each of fingers 36 and 37 has a lug 42 projecting into slot 41 and so positioned that when a lug is in the upper or lower end of slot 41 the finger will be withdrawn whereas when it is in the intermediate offset part of the slot 41 it will be projected. When wrapping during rotary knitting, in the leg for example, fingers 36 and 37 are positioned as shown in Fig. 9. That is to say, plate 40 is in its lowermost position so that finger 37 is projected and finger 36 withdrawn.

Finger 38 is also in withdrawn position as shown in Fig. 13. This is accomplished by means of a vertically slidable plate 43, similar to plate 40, and provided with a similar slot 44 with which lug 42 on finger 38 engages. In the arrangement shown plate 43 is raised to its uppermost position to retract finger 37.

To control the wrap fingers when wrapping during counter-clockwise reciprocatory strokes plate 40 is raised until finger 37 is withdrawn and finger 36 projected as shown in Fig. 10. During such strokes finger 38 is retracted as shown in Fig. 13. To wrap in clockwise reciprocatory knitting plate 40 is raised still further so that both fingers 36 and 37 are retracted as shown in Fig. 11. Plate 43 is lowered to project finger 38 as shown in Fig. 12 so that this finger can assume control of the wrap fingers. When no wrapping is being done all of the fingers 36, 37, and 38 are retracted as shown in Figs. 11 and 13 so that they have no effect upon the wrapping head, all of the fingers of which remain in inoperative position inside the needle circle.

It will be understood, of course, that the number and arrangement and sequence of operation of fingers 36, 37 and 38 can be varied to suit the type of wrapping head employed and the nature of the work being done. The device as shown, however, illustrates its essential characteristics.

Plate 40 is moved vertically to control fingers 36 and 37, as above described, by any suitable means such as a lever 45 pivoted at 46 in a suitable bracket and connected by suitable linkage to a timing device, for example, a pattern drum. Plate 43 may be similarly operated by a similar lever 47 also connected to the same or another pattern control.

Plate 32 upon which fingers 36, 37, and 38 and slides 39 and 42 are mounted is supported by a bracket 48 which in turn is pivotally supported at 49 upon carrier ring 33. The carrier ring itself is also mounted on pivot 50 in the usual way so that it can swing upward. Carrier ring 33 can swing up to the extent usually provided for by automatic means without striking wrapping head 2 when in its usual withdrawn position. However, to make accessible the inside of the needle cylinder and other adjacent parts, it is often desirable to swing the carrier ring much higher such as to the position illustrated in Fig. 14. In such a case, it is necessary to raise the wrapping head considerably above its usual position by raising shaft 1 to which the wrapping head is attached. This is done manually and is made possible by the fact that slot 12 in sleeve 6 (Figs. 2 and 3) is open at the top so that pin 9 can pass out of it. Therefore, shaft 1 of the wrapping head can be raised as shown in Figs. 4 and 14.

Since pin 9 is the element which normally maintains the timed relation between shaft 1 and the needle cylinder means must be provided for maintaining this relation after pin 9 has left slot 12. A means for this purpose is shown in Fig. 4 which consists of a key 51 attached to sleeve 6 and passing through the opening 11 in sleeve 4 and into a keyway 52 in shaft 1. Key 51 enters the top of keyway 52 just as pin 9 leaves slot 12 so that the relation between shaft 1 and sleeve 6 remains unaltered. When shaft 1 is in its normal position as shown in Figs. 2 and 3, key 51 is opposite the constricted portion 53 of shaft 1 so that it does not interfere with the shogging of the shaft.

Figure 14:
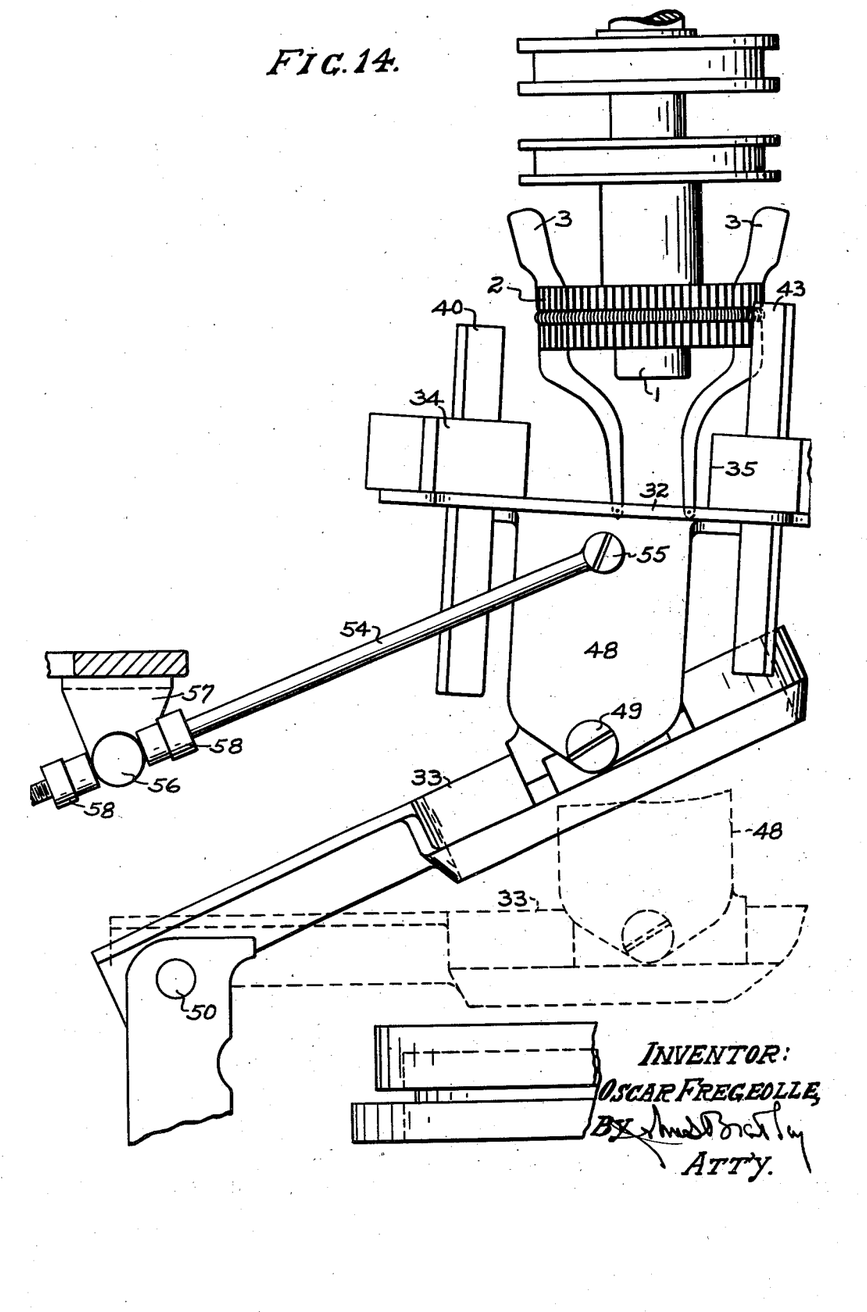
Fig. 14 is an elevation illustrating the manner in which the wrap yarn spindle and the finger operating mechanism are controlled when the carrier ring is raised.

Although shaft 1 and wrapping head 2 can thus be raised above operating position, fingers 36, 37 and 38 and their operating mechanisms are likely to strike head 2 when the carrier ring 33 is swung upwards to the extent shown in Fig. 14 because the wrap spindle moves vertically whereas the carrier ring and mechanism described swings upon a widely offset pivot 50. To prevent this means is provided to cause fingers 36, 37 and 38 and their operating mechanisms supported by a plate 32 to swing in the direction opposite to that in which the carrier ring swings sufficiently to keep wrapping head 2 more or less centered between them.

As previously stated, these elements are mounted on plate 32 which in turn is mounted on the carrier ring 33 by means of the pivoted bracket 48. Therefore, when the carrier ring is swung up as shown in Fig. 14, the parts mounted on plate 32 can be maintained in approximately vertical position. To do this automatically, the rod 54 is provided one end of which is pivotally attached at 55 to bracket 48 and the other end of which is pivotally mounted as shown at 56 on a suitable fixed bracket 57. The length and position of this rod is such that, when carrier ring 33 is swung up, rod 54 will swing approximately in parallel alignment although this can be varied within limits to insure that the devices mounted on plate 32 will not strike the wrapping head. As shown in Fig. 14, the rod 54 is of such length that plate 32 and the devices thereon are tilted slightly beyond the perpendicular to compensate for the horizontal component of the movement of pivot 49. The length of rod 54 is made adjustable through nuts 58.

Referring again to sleeve 6, through which shaft 1 is driven and shogged, slot 12 is preferably enlarged adjacent its lower end, as shown in Figs. 2 and 3, this enlargement being covered by a plate 59 in which is a slot forming the lower part of slot 12. This plate is attached to sleeve 6 by means of screws 60 passing through elongated slots 61 which parallel slot 12. Consequently, plate 59 is adjustable so that the effective length of slot 12 can be changed. The angle through which shaft 1 and wrapping head 2 are shogged can thus be altered within the limits of the adjustment.

It will be noted that this adjustment is provided at the lower end of slot 12 only. Consequently, the shogging is affected by it in one direction only. Ordinarily, any alteration of this sort should produce the same result in both directions of reciprocatory knitting. This is provided for by repositioning the wrapping head itself upon shaft 1 so that the alteration in shogging during reciprocatory knitting in one direction caused by an adjustment of plate 59 is compensated for, the net result being that one-half of the alteration is utilized in each direction of knitting.

The shogging of the wrap spindle with which this invention is primarily concerned should not be confused with the shogging of the wrap head itself independently of the spindle. Several wrapping heads are shoggable within themselves for making certain types of patterns. This invention does not affect the mode of operation of these wrapping heads but extends their use to reciprocatory knitting in both directions. In fact, practically any wrap spindle can be used.

The operating height of wrapping head 2 is determined by nut 62 which rests upon the upper end of sleeve 4 and through which the upper end 63 of shaft 1 is threaded. By turning this nut the vertical position of wrap head 2 can be raised or lowered to position it exactly in relation to the needles.

If desired, a washer 64 of leather or other resilient material may be inserted between the upper end 63 of sleeve 4 and nut 62 to reduce the shock of contact between the two when the spindle is returned to operating position from a higher inoperative position.

As already stated, the device of this invention can be used on other knitting machines than those of the Banner type, which was selected for description herein, including machines having two axially aligned cylinders.

I claim:

1. For a circular, independent needle, knitting machine having a cylinder and needles, a wrap spindle which includes a shaft, a wrapping head mounted thereon which requires shogging in order to wrap the same needle or needles in each direction of reciprocatory knitting, means adapted to rotate said shaft in either direction in timed relation to said cylinder and other means for shogging said shaft in either direction without affecting the operation of said rotating means.

2. For a circular, independent needle, knitting machine having a cylinder and needles, a wrap spindle which includes a shaft, a wrapping head mounted thereon which requires repositioning in order to wrap the same needles or needle in both directions of reciprocatory knitting, means for rotatably positioning said wrapping head for wrapping at least one predetermined needle in one direction of reciprocatory knitting and for repositioning said wrapping head to wrap the same needle or needles in the other direction of reciprocatory knitting.

3. For a circular, independent needle, knitting machine having a cylinder and needle, a wrap spindle according to claim 1 in which the means adapted to rotate said shaft in timed relation to said cylinder in either direction consists of a sleeve having another sleeve slidable thereon and a connection between said last mentioned sleeve and said shaft.

4. For a circular, independent needle, knitting machine having cylinders and needles, a wrap spindle according to claim 1 in which the means adapted to rotate said shaft in timed relation to said cylinder in either direction consists of a sleeve slidable upon another sleeve, said last mentioned sleeve being connected to a source of power and said first mentioned sleeve being operatively connected to said shaft so that the angular relation between said shaft and said sleeves can be altered to a predetermined degree at predetermined times.

5. For a circular, independent needle, knitting machine having cylinders and needles, a wrap spindle according to claim 1 in which the means adapted to rotate said shaft in timed relation to said cylinder in either direction consists of a sleeve slidable upon another sleeve, said last mentioned sleeve being connected to a source of power and said first mentioned sleeve being operatively connected to said shaft so that the angular relation between said shaft and said sleeves can be altered to a predetermined degree at predetermined times by sliding said first mentioned sleeve.

6. For a circular, independent needle, knitting machine having a cylinder and needles, wrap mechanism which includes a shaft, a wrapping head mounted thereon and positioned eccentric to the cylinder, said wrapping head being provided with wrap yarn feeding means adapted to be swung outward and inward across the needle circle, means for so swinging said feeding means at predetermined times and means for shogging said wrapping head so that a feeding means will feed wrap yarn to at least one predetermined needle in each direction of reciprocatory knitting.

7. For a circular, independent needle, knitting machine having a cylinder and needles, a wrap spindle according to claim 1 in which the means adapted to rotate said shaft in timed relation to said cylinder in either direction consists of a sleeve slidable upon another sleeve, said last mentioned sleeve being connected to a source of power and said first mentioned sleeve being operatively connected to said shaft so that the angular relation between said shaft and said sleeves can be altered to a predetermined degree and means for altering the said angular relation between said shaft and said sleeves in timed relation to the knitting cycle.

8. For a circular, independent needle, knitting machine having a cylinder and needles, means eccentric to the cylinder for feeding wrap yarn to needles and means for positioning said wrap yarn feeding means to feed wrap yarn to at least one predetermined needle in each direction of reciprocatory knitting, said feeding means being disconnectable from said positioning means.

9. For a circular, independent needle, knitting machine having a cylinder and needles, means eccentric to the cylinder for feeding wrap yarn to needles and means for positioning said wrap yarn feeding means to feed wrap yarn to at least one predetermined needle in each direction of reciprocatory knitting, feeding means being disconnectable from said positioning means and means for maintaining the angular relation between said cylinder and said feeding means while said feeding means is disconnected from said positioning means.

10. For a circular, independent needle, knitting machine having a cylinder and needles, a wrap spindle according to claim 1 which includes means for rendering said shogging means inoperative and means for retaining the timed relation between said shaft and said cylinder when said shogging means is inoperative.

11. For a circular, independent needle, knitting machine having a cylinder, needles and a carrier ring, wrap mechanism which includes a shaft, a wrapping head mounted thereon and positioned eccentric to the cylinder, said wrapping head being provided with wrap yarn feeding means adapted to be swung outward and inward across the needle circle, means for so swinging said feeding means at predetermined times and means for shogging said wrapping head so that a feeding means will feed wrap yarn to at least one predetermined needle in each direction of reciprocatory knitting said shaft and wrapping head being raisable vertically to an inoperative position, said means for swinging said feeding means across the needle circle being swingable upwardly with said carrier ring and means for guiding said last mentioned means during its upward swing to prevent it from striking said wrapping head.

OSCAR FREGEOLLE.

REFERENCES CITED

The following references are of record in the file of this patent:

UNITED STATES PATENTS

| Number | Name | Date |
|---|---|---|
| 2,118,815 | Houseman | May 31, 1938 |
| 2,141,042 | Levin | Dec. 20, 1938 |
| 2,148,985 | Houseman | Feb. 28, 1939 |
| 2,167,390 | Lawson | July 25, 1939 |
| 2,283,995 | Hutton | May 26, 1942 |
| 2,374,532 | Fregeolle | Apr. 24, 1945 |
| 2,009,294 | Getaz | July 23, 1935 |
| 2,287,001 | Lawson | June 16, 1942 |
| 2,012,607 | Houseman | Aug. 27, 1935 |
| 1,702,608 | Lawson | Feb. 19, 1929 |